United States Patent
Heinzelmann et al.

(10) Patent No.: US 11,563,351 B2
(45) Date of Patent: Jan. 24, 2023

(54) HAND-GUIDED TREATMENT DEVICE HAVING A MOTOR HOUSING

(71) Applicant: Andreas Stihl AG & Co. KG, Waiblingen (DE)

(72) Inventors: Georg Heinzelmann, Winnenden (DE); Martin Failenschmid, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/175,048

(22) Filed: Feb. 12, 2021

(65) Prior Publication Data

US 2021/0257875 A1 Aug. 19, 2021

(30) Foreign Application Priority Data

Feb. 14, 2020 (EP) ..................................... 20157369

(51) Int. Cl.
*H02K 5/04* (2006.01)
*H02K 5/02* (2006.01)
*H02K 7/14* (2006.01)

(52) U.S. Cl.
CPC ................. *H02K 5/04* (2013.01); *H02K 5/02* (2013.01); *H02K 7/145* (2013.01)

(58) Field of Classification Search
CPC ............. H02K 5/04; H02K 5/02; H02K 7/145
USPC ..................... 310/47, 50, 89, 418
See application file for complete search history.

(56) References Cited

U.S. PATENT DOCUMENTS

| 6,192,840 B1 * | 2/2001 | Durr ....................... F02B 75/16 |
| | | 30/381 |
| 6,622,387 B2 | 9/2003 | Uhl et al. |
| 9,744,685 B2 * | 8/2017 | Pellenc .................. H02K 9/227 |
| 2010/0083513 A1 | 4/2010 | Pellenc |
| 2011/0303723 A1 | 12/2011 | Spasov et al. |
| 2013/0318799 A1 | 12/2013 | Kato et al. |
| 2016/0121475 A1 | 5/2016 | Valentini |

(Continued)

FOREIGN PATENT DOCUMENTS

| DE | 100 38 141 A1 | 2/2002 |
| DE | 10 2010 030 077 A1 | 12/2011 |
| DE | 102011115720 A1 * | 4/2013 ............. B27B 17/00 |

(Continued)

OTHER PUBLICATIONS

German-language European Search Report issued in European Application No. 20157369.8 dated Aug. 4, 2020 with partial English translation (nine (9) pages).

*Primary Examiner* — Jose A Gonzalez Quinones
(74) *Attorney, Agent, or Firm* — Crowell & Moring LLP

(57) ABSTRACT

A hand-guided treatment device has a motor housing which includes a basic housing body that extends at least on a first housing side, and a remaining housing body, which is connected to the basic housing body and, together with the basic housing body, encloses a housing interior. A drive motor in the housing interior is held on the basic housing body. The basic housing body has a tool-holding device for holding a tool driven by the drive motor. The basic housing body forms a rigid motor- and tool-supporting structure which extends at least on the first housing side and on an adjoining second housing side, forming an L shape, wherein the remaining housing body forms a non-rigid remaining housing structure.

11 Claims, 4 Drawing Sheets

(56) References Cited

U.S. PATENT DOCUMENTS

2019/0111582 A1    4/2019  Suzuki et al.

FOREIGN PATENT DOCUMENTS

| DE | 10 2013 212 637 A1 | 12/2014 |
|----|--------------------|---------|
| EP | 2 668 840 A1       | 12/2013 |
| EP | 3 012 068 A1       | 4/2016  |

* cited by examiner

HAND-GUIDED TREATMENT DEVICE HAVING A MOTOR HOUSING

CROSS REFERENCE TO RELATED APPLICATION

This application claims priority under 35 U.S.C. § 119 from European Patent Application No. 20157369.8, filed Feb. 14, 2020, the entire disclosure of which is herein expressly incorporated by reference.

BACKGROUND AND SUMMARY OF THE INVENTION

The invention relates to a hand-guided treatment device comprising a motor housing, which comprises a basic housing body that extends at least on a first housing side, and a remaining housing body, which is connected to the basic housing body and, together with the basic housing body, encloses a housing interior. A drive motor in the housing interior is held on the basic housing body. The basic housing body comprises a tool-holding device for holding a treatment tool driven by the drive motor.

The basic housing body is preferably formed as a single part or, alternatively, is assembled from several parts. The remaining housing body completes the basic housing body as the remainder of the housing body, hence the designation remaining housing body, to form the motor housing. The remaining housing body too can preferably be formed as a single part or, alternatively, in several parts.

In the present case, the enclosure of the housing interior by the remaining housing body, together with the basic housing body, is intended to mean that, together with the basic housing body, the remaining housing body forms a complete housing ring, at least in a plane perpendicular to the first housing side, thus ensuring that the motor housing forms for the drive motor and any further device components accommodated therein an enclosure that is closed at least in this plane. In this arrangement, the basic housing body and the remaining housing body complement one another to form this complete ring, i.e. neither the basic housing body nor the remaining housing body alone form this complete ring.

Treatment devices of this kind are common in the areas of gardening and forestry as well as in construction and in the Do-It-Yourself (DIY) art, for example, in various embodiments for different treatment purposes, e.g. as power saws, hedging shears or cut-off grinders.

The prior art includes treatment devices of this kind in the form of power saws, in particular of the type with an electric drive motor, in which the basic housing body extends in the form of a plate only on the first housing side and forms a holding plate, consisting of a metal material for example, on the inside of which the drive motor is mounted and on the outside of which a guide rail for holding a saw chain as a treatment tool in a manner which allows circulating rotary movement is mounted. In this case, the remaining housing body can be formed in a hood or pot shape and can be capable of being placed on the basic housing body, with the result that it surrounds the housing interior on all the other housing sides.

German laid-open publication DE 10 2013 212 637 A1 discloses an electric power saw of this kind in which the basic housing body and, for the sake of good heat transfer, also the remaining housing body are formed from a metal material, and the drive motor is held on one side on the basic housing body and on an opposite side on the remaining housing body.

Similarly, U.S. Pat. No. 9,744,685 B2 discloses an electric power saw of this kind which has a brushless DC motor as a drive motor and in which the basic housing body and the remaining housing body are both formed from a light metal material, in particular an aluminium or magnesium material, for the sake of good heat dissipation.

The technical problem addressed by the invention is that of providing a hand-guided treatment device of the type stated at the outset which is distinguished from the above-mentioned prior art, particularly in respect of a different implementation of the motor housing.

The invention solves this problem by providing a hand-guided treatment device that comprises a motor housing having a basic housing body that extends at least on a first housing side, and a remaining housing body, which is connected to the basic housing body and, together with the basic housing body, encloses a housing interior. A drive motor in the housing interior is held on the basic housing body. The basic housing body comprises a tool-holding device for holding a treatment tool driven by the drive motor. The basic housing body forms a rigid motor- and tool-supporting structure which extends at least on the first housing side and on an adjoining second housing side, forming an L shape, while the remaining housing body forms a non-rigid remaining housing structure.

The rigid motor- and tool-supporting structure can be formed as a single part or from several parts connected to one another. Depending on requirements, the rigid motor- and tool-supporting structure extends respectively only on the first and the second housing side as far as a housing corner region, at which the first and the second housing side meet, thereby forming a pure and simple L shape or, alternatively, additionally on a third housing side to form an L shape extended into a kind of U shape or, as a further alternative, on the first and the second housing side not just as far as the housing corner region concerned on both sides but beyond the housing corner region on one side or, in other words, with something of an inward offset, thereby forming an L shape extended into a kind of T shape.

In the present case, the specification that the basic housing body forms a rigid motor- and tool-supporting structure, and the remaining housing body forms a non-rigid remaining housing structure should be interpreted to mean that the basic housing body forms a more rigid structure than the remaining housing body and, for this purpose, is formed, in particular, from a material which has a higher modulus of elasticity than the material chosen for the remaining housing body, which is a different material. In particular, the basic housing body has a rigidity which is great enough to be able to hold the drive motor and the tool thereon with sufficient stability. The remaining housing body is designed for a rigidity which is lower than this and preferably significantly lower, something that can advantageously be used to keep down the weight and material consumption of the treatment device and/or to improve the drop characteristics thereof inasmuch as the remaining housing body can absorb impact energy if the device accidentally falls to the ground. Further contributing to the rigidity of the motor- and tool-supporting structure is the fact that the structure extends at least on two mutually adjoining housing sides, thereby forming the L shape. It is thereby possible to increase the rigidity of the structure relative to a purely plate-shaped structure, even if the same material is used as for the plate-shaped structure. Moreover, this also increases the rigidity of the remaining housing body, which is connected three-dimensionally, i.e. spatially, to the basic housing body, and not just in one plane.

In a development of the invention, the modulus of elasticity of the remaining housing body and that of the basic housing body differ by at least a factor of two, in particular by at least a factor of ten. This results in a correspondingly higher rigidity of the basic housing body in comparison to that of the remaining housing body.

In a development of the invention, the first housing side forms a housing longitudinal side, and the second housing side forms a housing transverse side, and, on the first housing side and on the second housing side respectively, the rigid motor- and tool-supporting structure of the basic housing body extends over more than half the distance between a device front side and a device rear side. Thus, the comparatively high rigidity of the basic housing body is provided for the relevant housing longitudinal side and the relevant housing transverse side in each case along most of the length between the front and the rear side of the device, as a result of which the motor housing as a whole can have a correspondingly high rigidity, and a high stability for fastening the drive motor and the tool can be achieved. In this context, the device front side should in general be interpreted to mean a front device side which is parallel to the housing transverse side and on which the tool is situated or beyond which a tool part projects forwards. Correspondingly, the device side which faces away from the device front side and on which, for example, there can be a battery well or from which a battery well can project rearwards or on which there can be a rear handle or from which a rear handle can project rearwards should be interpreted as the device rear side.

In one embodiment of the invention, on the first housing side, the rigid motor- and tool-supporting structure of the basic housing body extends from a device front side to a device rear side. This makes a further contribution to high rigidity of the motor housing and to high stability for holding the drive motor and the tool, wherein the weight of the treatment device can nevertheless be kept low in a desired manner by a correspondingly lightweight embodiment of the remaining housing body. In alternative embodiments, the rigid motor- and tool-supporting structure extends over more than half but less than the whole length on the first housing side.

In another embodiment of the invention, the rigid motor- and tool-supporting structure of the basic housing body additionally extends on a third housing side adjoining the first housing side, forming a U shape. In this case, the L shape of the motor- and tool-supporting structure is extended by a further structure side, i.e. a further U leg, to form the U shape, something that can advantageously contribute to increased rigidity of the motor- and tool-supporting structure provided by the basic housing body. Depending on requirements, additional device components can be mounted or held in a correspondingly stable manner on this third side of the rigid motor- and tool-supporting structure. In alternative embodiments, the rigid motor- and tool-supporting structure extends only on the first and the second housing side.

In a development of the invention, the rigid motor- and tool-supporting structure of the basic housing body comprises the tool-holding device on the outside of the first housing side and comprises a motor-holding device for holding the drive motor on the inside of said first housing side.

In a development of the invention, the rigid motor- and tool-supporting structure of the basic housing body extends in the form of a plate on the first housing side and extends in such a way as to form a hollow body structure on the second housing side. The hollow body structure can make a further contribution to high rigidity of the motor- and tool-supporting structure of the basic housing body.

In one embodiment of the invention, the hollow body structure forms a liquid container. Thus, the hollow body structure of the basic housing body can advantageously be used to provide the liquid container. In alternative embodiments, the hollow body structure can be formed by an open hollow profile, for example.

In a development of the invention, the basic housing body is formed from a metal material, and the remaining housing body is formed from a plastics material. This represents a choice of materials that is optimum in many applications for the basic housing body, on the one hand, and the remaining housing body, on the other. Alternatively, both housing parts can be formed from a metal material or a plastics material, for example.

In a development of the invention, the treatment device is configured as a power saw or as a cut-off grinder or as hedging shears. These are advantageous implementations of the treatment device, in which the rigid motor- and tool-supporting structure can be combined well with an embodiment of the remaining housing body that has a low weight in order to provide optimum stability with a low weight for the overall treatment device, making it easier for the user to handle the treatment device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
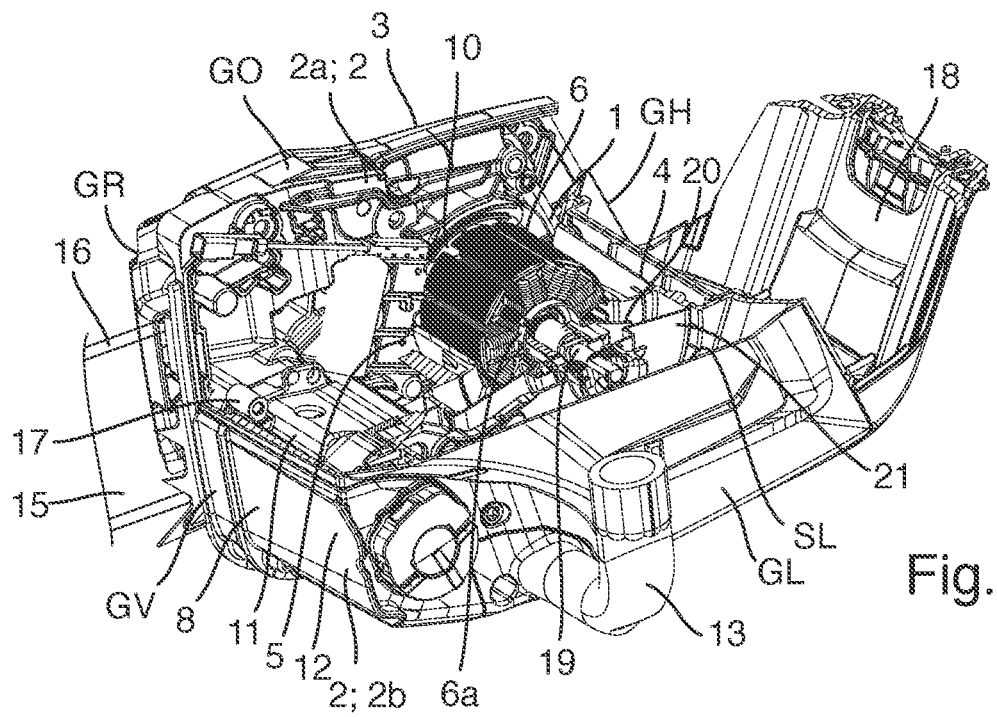
FIG. 1 shows a cut-away perspective view of a part—of interest in the present context—of a treatment device embodied as a power saw of the top-handle type.
Figure 5:
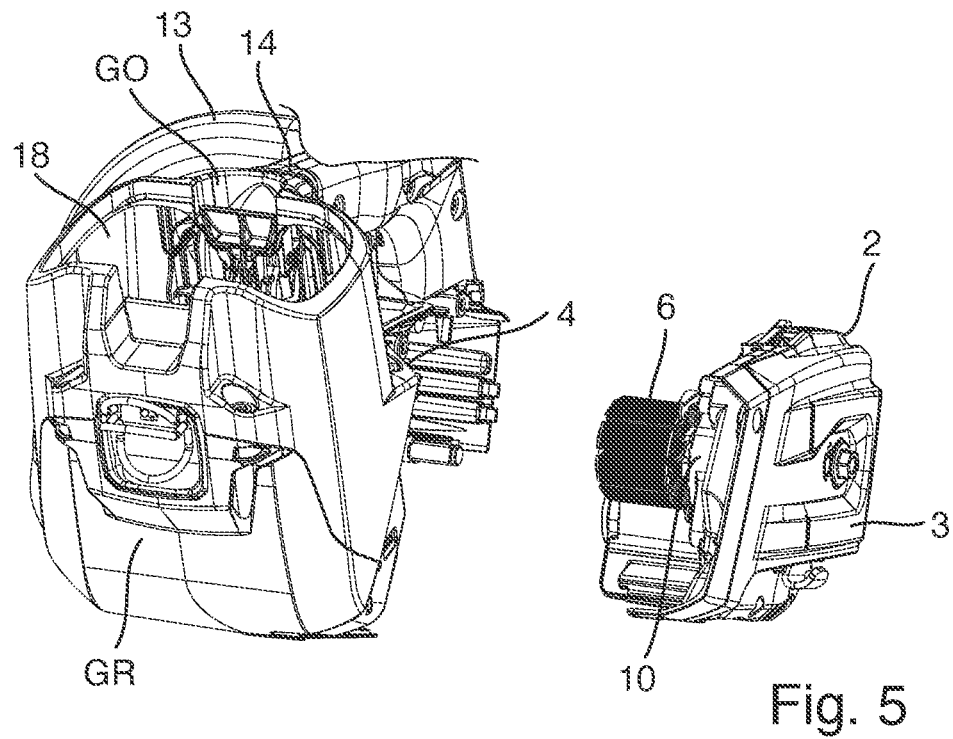
FIG. 5 shows a perspective exploded view of a housing-related part of the power saw.

In the figures, exemplary embodiments of the hand-guided treatment device according to the invention in the form of power saws of the "top-handle" type or "rear-handle" type are illustrated. Both types of power saw have an auxiliary handle 13, which is partially visible in FIGS. 1 and 6, and a main handle 14, which is on a device upper side GO in the case of the top-handle type, as can be seen in FIG. 5, and on a device rear side GH in the case of the rear-handle type, as can be seen from FIG. 6. This assumes an orientation in which an associated treatment tool part, in this case a guide rail 15 and a saw chain that acts as a treatment tool 16 and can be driven so as to circulate around the guide rail 15, extends forward from a device front side GV.

As will become clear from the exemplary embodiments shown, the treatment device comprises a motor housing 1, which comprises a basic housing body 2 and a remaining housing body 4, i.e. the remainder of the housing body, which is connected to said main body. The basic housing body 2 extends at least on a first housing side 3, which is on a right-hand device side GR in the examples shown, as can be seen from FIGS. 1 and 6.

Together with the basic housing body 2, the remaining housing body 4 encloses a housing interior 5, in which a drive motor 6 held on the basic housing body 2 is accommodated. In this context, "enclose" means that the remaining housing body 4, together with the basic housing body 2, fully surrounds the housing interior 5, at least in a plane perpendicular to the first housing side 3, forming a complete ring. Such a complete ring can be seen in the section plane perpendicular to the first housing side in FIG. 1, for example, the remaining housing body 4 being shown in section in this plane, thus enabling the complete ring along a correspondingly shown section line SL to be easily seen. In this example, this plane of the complete ring consequently lies in a horizontal plane in the normal use position of the power saw, in which the guide rail 15 is in a vertical plane. Depending on requirements and the particular use, such a complete ring can also be provided by the basic housing body 2 and the remaining housing body 4 around the housing interior 5 in the plane perpendicular to said plane of the complete ring and to the first housing side 3.

Figure 3:
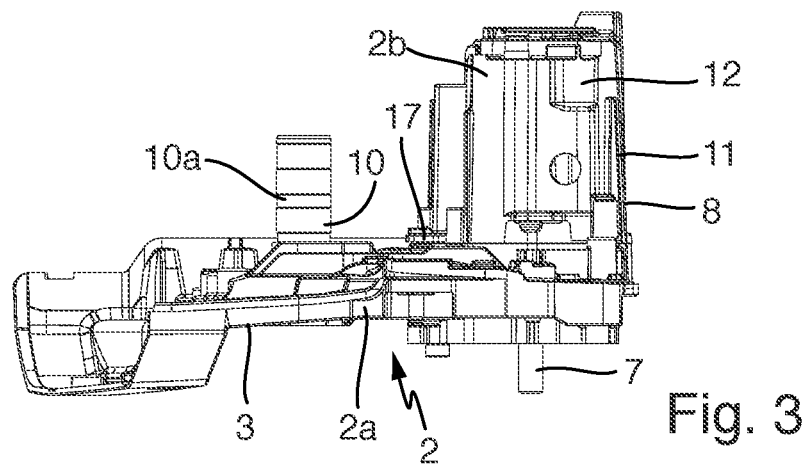
FIG. 3 shows a side view of a basic housing body of the motor housing.
Figure 4:
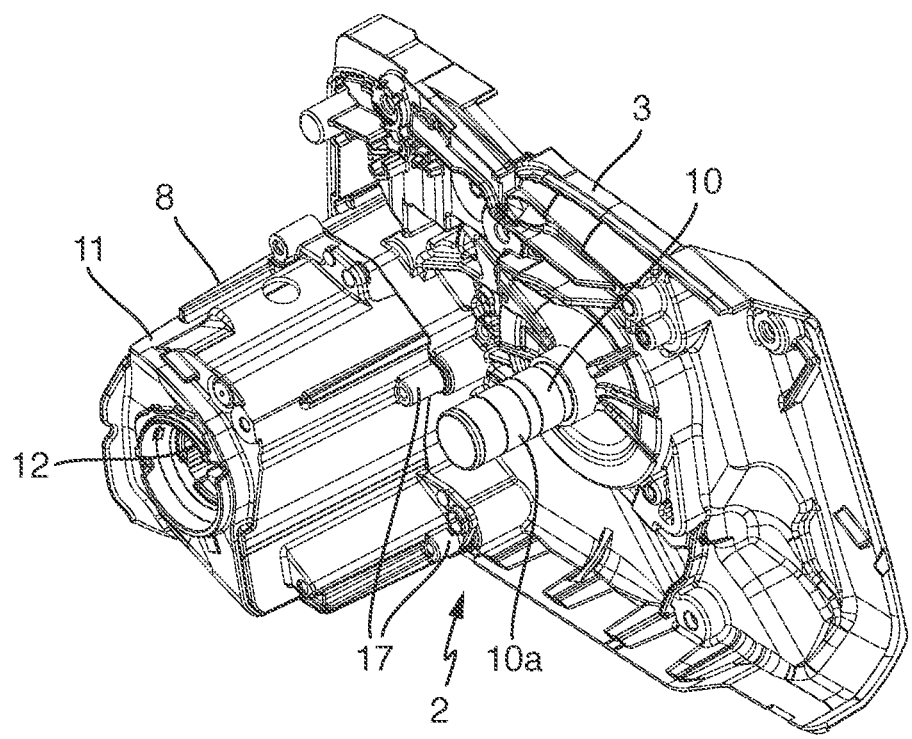
FIG. 4 shows a perspective view of the basic housing body.
Figure 8:
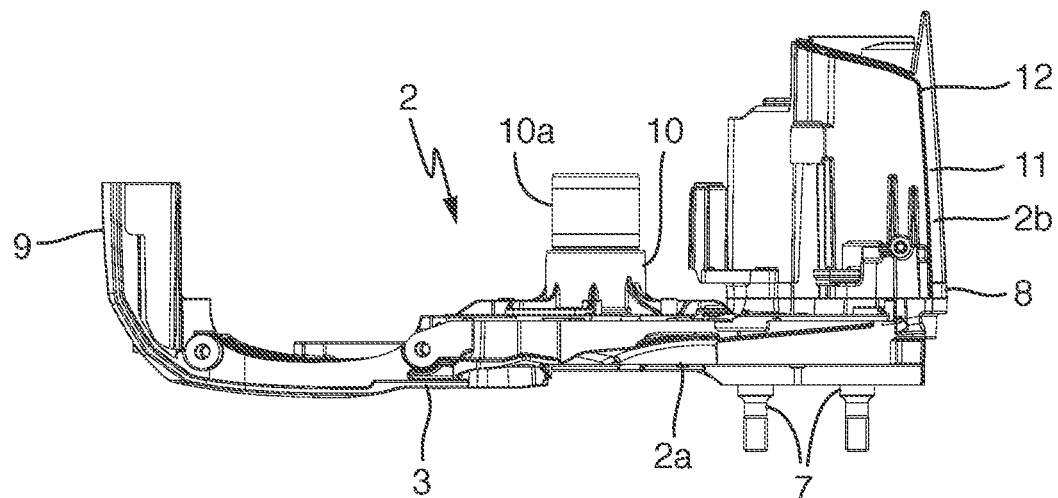
FIG. 8 shows a side view corresponding to FIG. 3 of a variant embodiment of FIG. 6.

The basic housing body 2 has a tool-holding device 7, visible in the views in FIGS. 3 and 8, for holding the treatment tool 16, more specifically in this case a holding device by means of which the guide rail 15 and, together with the latter, the saw chain arranged so as to circulate thereon can be held in a conventional manner.

The basic housing body 2 forms a rigid motor- and tool-supporting structure which extends at least on the first housing side 3 and on an adjoining second housing side 8, forming an L shape. The L shape of the rigid motor- and tool-supporting structure along the first and the second housing side 3, 8 is clearly discernible from the side views in FIGS. 3 and 8, for example. In the examples shown, the second housing side 8 is situated on the device front side GV.

The remaining housing body 4 forms a non-rigid remaining housing structure, i.e. it is of less rigid construction than the basic housing body 2, in particular since it is composed of a material that has a lower modulus of elasticity than that of the basic housing body 2. In corresponding embodiments, the modulus of elasticity of the remaining housing body 3 and that of the basic housing body 2 differ by at least a factor of two, preferably by a significantly higher factor, e.g. by at least a factor of ten or at least a factor of twenty. This can be achieved, in particular, through the choice of correspondingly different materials for the basic housing body 2, on the one hand, and the remaining housing body 3, on the other, in particular also in the exemplary embodiments shown.

The basic housing body 2 can be formed as a single part or in several parts. In the examples shown, it is formed in several parts and comprises a first part 2a, which extends at least on the first housing side 3, and a second part 2b, which is connected rigidly to said first part and extends substantially on the second housing side 2 and is connected releasably or non-releasably to the first part in a conventional manner. In the examples shown, a releasable connection by means of screwed joints 17 is provided for this purpose.

The remaining housing body 4 is likewise constructed as a single part or in several parts, depending on requirements. In corresponding embodiments, it forms a hood-type surround, the hood interior of which forms the housing interior 5, in which the drive motor 6 is accommodated and which is closed on one or more open sides by the basic housing body 2.

Figure 2:
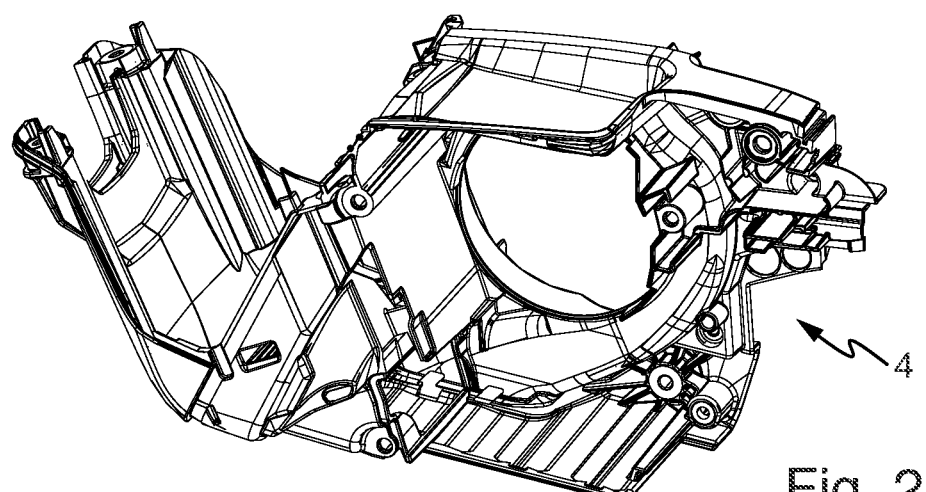
FIG. 2 shows a perspective view of a part of a remaining housing body of a motor housing of the power saw in FIG. 1.

Depending on requirements, the motor housing 1 formed by the basic housing body 2 and the remaining housing body 4 can be embodied in such a way that it houses only the drive motor 1 and the peripheral components thereof or simultaneously forms a device housing in which further device components of the treatment device are accommodated, e.g. a ventilator fan 20 for the drive motor 6 and/or a rechargeable battery that supplies the drive motor 6 if, as in the exemplary embodiments shown, said motor is an electric drive motor and not an internal combustion engine. FIG. 2 shows more specifically a main part of the remaining housing body 4, which can be complemented by one or more further housing parts to form the overall remaining housing body 4. Thus, in the examples shown, the remaining housing body 4, together with the basic housing body 2, forms a device housing having a battery well 18 to accommodate the rechargeable battery. In the examples shown, the remaining housing body 4 furthermore has a housing part 21 for the ventilator fan 20. Apart from the housing parts shown in the figures, the remaining housing body 4 can comprise further housing parts, e.g. a housing part acting as a device hood part and/or one or more outer housing parts for covering the device on the outside.

In corresponding embodiments, as in the exemplary embodiments shown, the first housing side 3 forms a longitudinal housing side, on the right-hand device side GR in the exemplary embodiments shown, and the second housing side 8 forms a transverse housing side, on the device front side GV in the exemplary embodiments shown. In this case, the rigid motor- and tool-supporting structure of the basic housing body 2 extends over more than half the length between the device front side GV and the device rear side GH both on the first housing side 3 and on the second housing sign 8 in the exemplary embodiments shown. As in the examples shown, the basic housing body 2 preferably extends over substantially the entire length between the device front side GV and the device rear side of GH. Moreover, the basic housing body 2 in the examples shown also extends over approximately the entire length of the second housing side 8. With this configuration, the basic housing body 2 provides a very stable L-shaped, rigid structure for the device as a whole.

Figure 6:
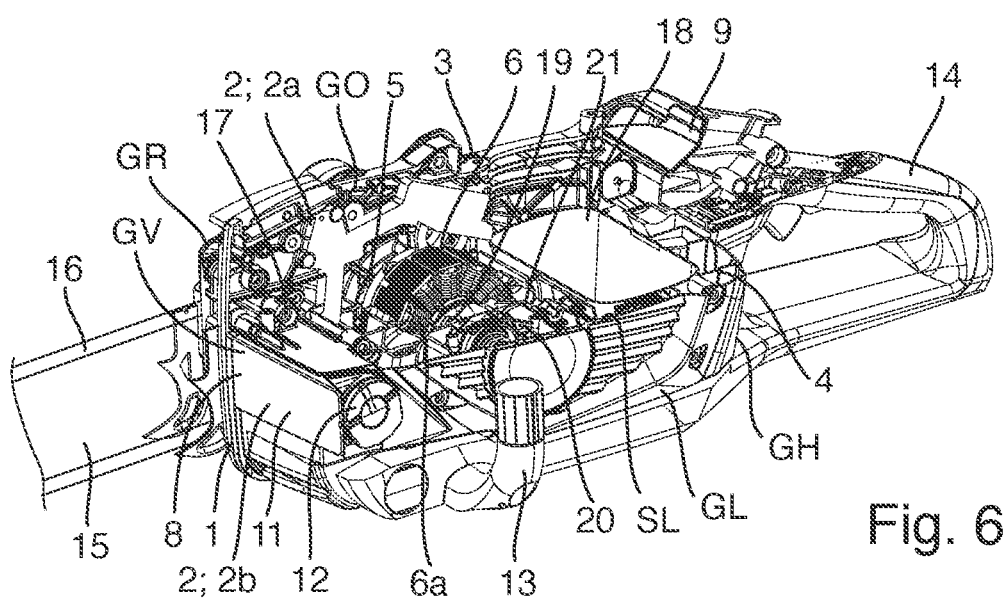
FIG. 6 shows a view corresponding to FIG. 1 of a variant embodiment of the treatment device as a power saw of the rear-handle type.
Figure 7:
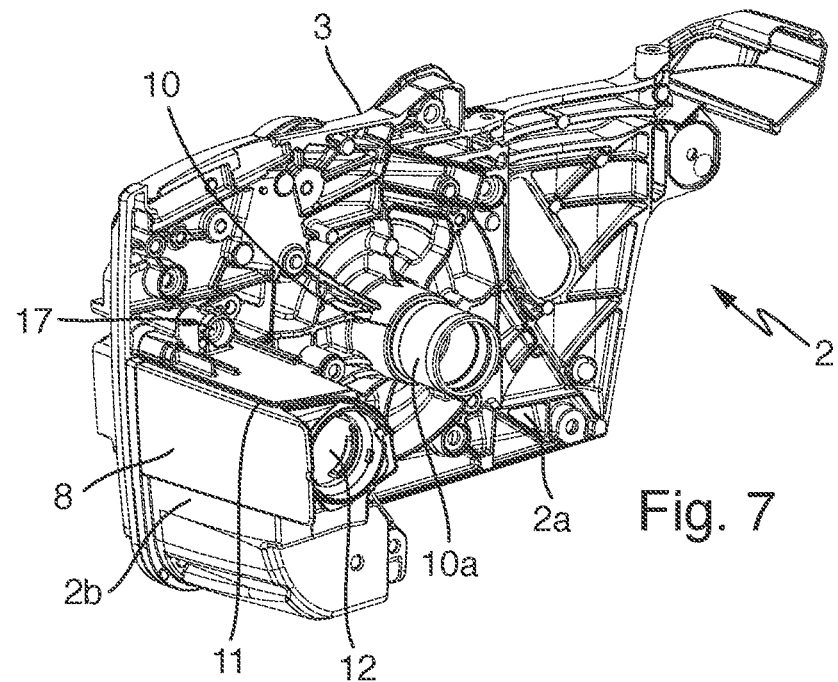
FIG. 7 shows a perspective view of a basic housing body of a motor housing of the power saw in FIG. 6.

In corresponding embodiments, the rigid motor- and tool-supporting structure of the basic housing body 2 additionally extends on a third housing side 9 adjoining the first housing side 3, forming a U shape, as implemented in the exemplary embodiment in FIGS. 6 to 8. In this embodiment shown, the third housing side 9 is situated on the device rear side GH, as can be seen from FIG. 6. The U shape of the rigid motor- and tool-supporting structure of the basic housing body 2 in this implementation is readily discernible from the side view in FIG. 8. Here, the extent of the basic housing body 2 along the first housing side 3 forms the central web of the U shape, while the extent of the basic housing body 2 on the second housing side 8 and the third housing side 9 forms the two U legs.

In the example shown, the rigid motor- and tool-supporting structure of the basic housing body 2 on the third housing side 9 does not extend over the entire length thereof but only along about a third to about half of the length of the third housing side 9. Extending over the remaining length is the remaining housing body 4, which, in both the exemplary embodiments shown, furthermore extends over the entire length of the housing side which lies opposite the first housing side 3 and therefore is situated on a right-hand device side GR, as can be seen from FIGS. 1 and 6.

In corresponding embodiments, the rigid motor- and tool-supporting structure of the basic housing body 2 comprises the tool-holding device 7 on the outside of the first housing side 3 and a motor-holding device 10 for holding the drive motor 6 on the inside of said first housing side, as in the exemplary embodiments shown. In the examples shown, the tool-holding device 7, in accordance with the embodiment of the treatment device as a power saw, is designed to hold the guide rail 15 firmly on the rigid motor- and tool-supporting structure of the basic housing body 2 and to couple the tool 16, i.e. the saw chain, to a drive shaft 19 of the drive motor 6 via a chain wheel. In the examples shown, the motor-holding device 10 comprises a sleeve-shaped stator carrier 10a or motor flange, on which a stator 6a of the drive motor 6 is held in a non-rotatable manner and through which the drive shaft 19 extends in a rotatable manner.

In corresponding embodiments, the rigid motor- and tool-supporting structure of the basic housing body 2 extends in the form of a plate on the first housing side 3 and, on the second housing side 8, in such a way as to form a hollow body structure 11, as is the case in the examples shown. For corresponding uses, the hollow body structure 11 is implemented in such a way that it forms a liquid container 12. In the examples shown, it is used specifically to form a lubricating oil tank as a liquid container 12, in which lubricating oil for the tool 16 can be stored.

In advantageous embodiments, the basic housing body 2 is formed from a metal material, and the remaining housing body 4 is formed from a plastics material. In particular, this selection of materials can also be made in the exemplary embodiments shown. The basic housing body can be composed of one or more magnesium die castings connected rigidly to one another, for example, while the remaining housing body can be composed of a fibre-reinforced or non-fibre-reinforced plastics material, for example.

In the exemplary embodiments shown, as stated, the treatment device is embodied as a power saw, in particular as an electric power saw, i.e. with an electric motor as the drive motor 6. In alternative embodiments, the treatment device is, for example, a power saw with an internal combustion engine as the drive motor or hedging shears or some other device that can be used in gardening and forestry, or as a cut-off grinder or some other device that can be used in construction and DIY.

As the exemplary embodiments which are shown and those which are explained above make clear, the invention makes available an advantageous hand-guided treatment device that has a motor housing and a drive motor accommodated therein and can be implemented with a relatively low device weight and a high housing stability as well as optimum handling by the user. Contributing to this, in particular, is the fact that the basic housing body forms a rigid motor- and tool-supporting structure which extends at least on the first housing side and on an adjoining second housing side, forming a pure L shape or an L shape extended into a U shape, and the remaining housing body forms a non-rigid remaining housing structure. The treatment device can be used in corresponding embodiments for many work purposes, especially in the technical sectors of gardening and forestry as well as in construction and DIY.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided treatment device, comprising:
   a motor housing, which comprises a basic housing body that extends at least on a first housing side, and a remaining housing body, which is connected to the basic housing body and, together with the basic housing body, encloses a housing interior; and
   a drive motor in the housing interior, said motor being held on the basic housing body, wherein
   the basic housing body comprises a tool-holding device for holding a treatment tool driven by the drive motor,
   the basic housing body forms a rigid motor- and tool-supporting structure which extends at least on the first housing side and on an adjoining second housing side, forming an L shape, and
   the remaining housing body forms a non-rigid remaining housing structure.

2. The hand-guided treatment device according to claim 1, wherein
   the modulus of elasticity of the remaining housing body and that of the basic housing body differ by at least a factor of two.

3. The hand-guided treatment device according to claim 2, wherein
   the modulus of elasticity of the remaining housing body and that of the basic housing body differ by at least a factor of ten.

4. The hand-guided treatment device according to claim 1, wherein
   the first housing side forms a housing longitudinal side, and the second housing side forms a housing transverse side, and
   on the first housing side and on the second housing side respectively, the rigid motor- and tool-supporting structure of the basic housing body extends over more than half the distance between a device front side and a device rear side.

5. The hand-guided treatment device according to claim 4, wherein
   on the first housing side, the rigid motor- and tool-supporting structure of the basic housing body extends from the device front side to the device rear side.

6. The hand-guided treatment device according to claim 5, wherein
   the rigid motor- and tool-supporting structure of the basic housing body additionally extends on a third housing side adjoining the first housing side, forming a U shape.

7. The hand-guided treatment device according to claim 1, wherein
   the rigid motor- and tool-supporting structure of the basic housing body comprises the tool-holding device on the outside of the first housing side and comprises a motor-holding device for holding the drive motor on the inside of said first housing side.

8. The hand-guided treatment device according to claim 1, wherein
   the rigid motor- and tool-supporting structure of the basic housing body extends in the form of a plate on the first housing side and extends in such a way as to form a hollow body structure on the second housing side.

9. The hand-guided treatment device according to claim 8, wherein
the hollow body structure forms a liquid container.

10. The hand-guided treatment device according to claim 1, wherein
the basic housing body is formed from a metal material, and
the remaining housing body is formed from a plastics material.

11. The hand-guided treatment device according to claim 1, wherein
the device is configured as a power saw, a cut-off grinder, or hedging shears.

* * * * *